United States Patent [19]

Kogan et al.

[11] Patent Number: 5,809,317
[45] Date of Patent: Sep. 15, 1998

[54] CREATING AND MAINTAINING HYPERTEXT LINKS AMONG HETEROGENEOUS DOCUMENTS BY THE ESTABLISHMENT OF ANCHORS AND CONNECTIONS AMONG ANCHORS

[75] Inventors: Dan D. Kogan, Portland; Paul C. Drews, Hillsboro; James P. Held, Portland; James A. Larson, Beaverton, all of Oreg.

[73] Assignee: Intel Corporation, Santa Clara, Calif.

[21] Appl. No.: 869,499

[22] Filed: Jun. 5, 1997

Related U.S. Application Data

[63] Continuation of Ser. No. 540,322, Oct. 20, 1995, abandoned, which is a continuation of Ser. No. 999,110, Dec. 30, 1992, abandoned.

[51] Int. Cl.$^6$ .................................................. G06F 17/30
[52] U.S. Cl. ...................... 395/762; 395/611; 395/770; 395/774; 395/777
[58] Field of Search ................................. 395/777, 762, 395/611, 770, 774

[56] References Cited

U.S. PATENT DOCUMENTS

| | | | |
|---|---|---|---|
| 4,982,344 | 1/1991 | Jordan | 395/157 |
| 5,133,068 | 7/1992 | Crus | 395/600 |
| 5,133,075 | 7/1992 | Risch | 395/600 |
| 5,303,379 | 4/1994 | Khoyi | 395/725 |
| 5,421,012 | 5/1995 | Khoyi et al. | 395/650 |
| 5,421,015 | 5/1995 | Khoyi et al. | 395/650 |
| 5,530,852 | 6/1996 | Meske, Jr. et al. | 395/600 |

OTHER PUBLICATIONS

Microsoft Corporation "Object Linking And Embedding Backgrounder," pp. 1–8, (Dec. 1990).

Paul Klemond, "Taking the Bull by the Horns: Investigating Object Linking and Embedding, Part I," Microsoft Systems Journal, pp. 19–38, (Mar. Apr. 1992).

No author, *Windows API vol. III, Windows 3.1 Reference Guide* T.O.C. and 71–134 (1992).

Ted Nelson, *Computer Lib*, Tempus Books of Microsoft Press (1974), pp. 1–3.

V. Bush, "As We May Think," *The Atlantic Monthly*, vol. 176, No. 1, Boston, Massachusetts (Jul. 1945), pp. 101–108.

R.M. Akscyn, D.L. McCracken, and E.A. Yoder, "KMS: A Distributed Hypermedia System for Managing Knowledge in Organizations," *Communications of the ACM*, vol. 31, No. 7 (1988), pp. 820–835.

J.H. Morris, "Make of Take' Decisions in Andrew," *USENIX Winter Conference*, Dallas, Texas (Feb. 9–12, 1988), pp. 1–8.

C.J. Date, *An Introduction of Database Systems*, Addison–Wesley Publishing Company (1981), Table of Contents through p. 28.

(List continued on next page.)

*Primary Examiner*—Thomas G. Black
*Assistant Examiner*—Jean R. Homere
*Attorney, Agent, or Firm*—Blakely, Sokoloff, Taylor & Zafman

[57] ABSTRACT

A method and apparatus for relating (called hyperlinking) a region of one document to one or more regions of other documents. This is provided by using a mechanism for linking and embedding objects to establish the endpoints of the hyperlinks (called anchors) together with the creation of intermediate tables which maintain information about relations between regions of documents and attributes of the relationship. When a user selects a region in a document which participates in a relationship, a database program is invoked which displays information about related regions in other documents which may be accessed through the intermediate tables. An auxiliary table maintains information about attributes which may be custom designed by the user, such as author, date of creation, etc. The intermediate tables allow relationships among multiple regions of documents created by different applications. Relationships are bidirectional in that the user can traverse from any region in a document to any other region in the same relationship.

17 Claims, 9 Drawing Sheets

OTHER PUBLICATIONS

F. G. Halasz, T.P. Moran, and R.H. Trigg, "NoteCards in a Nutshell," *Proceedings of the ACM CHI+GI '87 Conference*, Toronto, Canada (Apr. 5–9, 1987).

J. Nielsen, *Hypertext and Hypermedia,* Academic Press, Inc. (1990), Table of Contents through p. 14.

J.D. Ullman, *Principles of Database Systems*, Computer Science Press (1980), Table of Contents.

N. Yankelovich, B.J. Haan, N.K. Meyrowitz, and S.M. Drucker, "Intermedia; The Concept and the Construction of Seamless Information Environment," *Computer* (Jan. 1988), pp. 81–96.

Microsoft Corporation, *Microsoft® Windows™ Version 3.1 User's Guide* (1990–1992), Table of Contents and Chapter 13 (pp. 487–503).

Hewlett Packard, *HP NewWave User's Guide* (1990), Table of Contents and pp. 246–251.

Asymetrix®, *Using ToolBook™, A Guide to Building and Working with Books* (1989–1991), Table of Contents and pp. 150–156.

N.J. Nilsson, *Principles of Artificial Intelligence*, Tioga Publishing Company, Palo Alto, California (1980), Table of Contents and pp. 99–100.

| Hyperlinks Table | | |
|---|---|---|
| Link ID | Link Name | Other fields |
| 1 | South Col Route | | ← 601
| 2 | Relative Of | | ← 602
| | | |

610  620  630

Figure 6
The Table Representation of Hyperlinks

700

| Connections Table | |
|---|---|
| Link ID | Participant Anchor ID |
| 1 | 2 | ← 730
| 1 | 3 | ← 731
| 1 | 5 | ← 732
| 2 | 2 | ← 741
| 2 | 4 | ← 742
| | |

|  | Attributes Table | |
|---|---|---|
| Link ID | Attribute Name | Attribute Value |
| 1 | Owner | Larson |
| 1 | Creation Date | 6/24/92 3:56 PM |
| 2 | Last Changed | 12/15/92 10:39 PM |
| 2 | Owner | Kogan |
| 2 | Date | 12/15/92 10:39 PM |
|  |  |  |

CREATING AND MAINTAINING HYPERTEXT LINKS AMONG HETEROGENEOUS DOCUMENTS BY THE ESTABLISHMENT OF ANCHORS AND CONNECTIONS AMONG ANCHORS

This is a continuation of application Ser. No. 08/540,322, filed Oct. 20, 1995, now abandoned, which is a continuation of application Ser. No. 07/999,110, filed Dec. 30, 1992, abandoned.

BACKGROUND OF THE INVENTION

1. Field of the Invention

The present invention presents a mechanism for establishing and maintaining associations among information residing in documents stored electronically in computer systems. More specifically, this invention presents a method of relating and maintaining arbitrary relationships among electronic documents created and updated by separate application programs.

2. Background Information

Definitions

We define an application program (or simply, application) as software that is not part of the underlying computer's operating system and performs a collection of related functions on behalf of users and under their control. Application programs allow users to create and manage different kinds of information. Examples of applications include spreadsheets, word processors, drawing packages, presentation graphics, and others. Applications can be characterized by a user interface, that is, the way in which users interact with the application, a data storage scheme, that is, the way in which the application stores its data, and the internal manipulations and transformations that the application applies to the data. In general, applications that fall in the same category have similar behavior but differ in their user interfaces, their data storage schemes, and their internal transformations, for example, there are several dozen word processing programs currently available.

We will use the term document to refer to the data users create using an application program. Users retrieve, manipulate and save the contents of a document using the same application that they used to create the document in the first place. Example documents include spreadsheets created by spreadsheet programs, reports created by word processors, and others.

A link is an arbitrary association, between a document or portion of a document and another document or portion of another document. A hyperlink is an association between a document or portion of a document and a collection or documents or portions of documents. A collection of such hyperlinks can be viewed to form a mathematical structure called a hypergraph. Neilsen, Jakob; *Hypertext & Hypermedia;* Academic Press; 1990 ("Neilsen 1990"), Ullman, Jeffrey D.; *Principles of Database Systems;* Computer Science Press; 1980. If multiple documents (or portions of documents) have the same labeled links with a single document (or portion of a document) then those links are in reality a hyperlink. In this discussion, we will use the two terms link and hyperlink interchangeably, since in general, it is possible to represent a hyperlink as a collection of links and a link is simply a degenerate case of a hyperlink. The term hyperlink emphasizes the potential for multiple connections.

Motivation for the Present Invention

It has been long recognized that one of the major advantages of managing documents electronically lies in the ability to establish and maintain arbitrary associations between the various stored documents. Bush, Venevar; As We May Think; in *Atlantic Monthly,* July 1945. (Reprinted in *CD-ROM—The New Papyrus,* pp. 101–108, Lambert & Ropiequet (eds.), Microsoft Press, 1986), Nelson, Ted; *Computer Lib/Dream Machines;* T. Nelson self-Published; 1974. Revised edition published by Microsoft Press 1980. For example, a document describing Hillary's first ascent of Everest might be related to treatises on the geography of the Khumbu glacier region, to sociology studies of the Sherpas, to socioeconomic studies of the effects of tourism on the local cultures, to the impact of siege-style climbing on the environment, and many others. All such associations would be represented in terms of the previously mentioned hyperlinks. Readers of any one of these cross-linked documents would be able to follow the links and open another document to the relevant passage[1]. For example, while reading about the use of bottled oxygen by the climbers, a user could, by invoking simple user interface commands or gestures such as pressing a button or selecting from a pull-down menu, open a study on oxygen debt incurred by high altitude climbers. This would be possible without burdening the user with following the path to the related document nor finding the application needed to view it.

[1] Compare this scenario with its paper equivalent, where such associations must take the form of references, e.g. "see also . . . " in which case the reader must physically find and open a book containing the referred section, or digressions such as insets, footnotes, or appendices, which burden books with extra bulk and readers with physical context switching.

The current state of the art in computer science has yielded a class of applications known as hypertext systems (Neilsen 1990) that allow such connections or associations to be established among electronic documents. Unfortunately, the current state of the art suffers from several major shortcomings: restricted support, monolithic applications, and monolithic environments.

Restricted support includes those hypertext systems that can not establish links among some classes of documents. For example, many hypertext systems can only link documents consisting of ASCII text. Such systems include Unix Guide from Owl International, and the Gnu TechInfo system.

Monolithic applications are those in which users not only establish links but also create and edit the documents from within the same application. Such systems combine word processing, drawing, and other capabilities with the linking tools in order to provide users with a single environment in which to perform all document management and linking tasks. The drawback is that users are confined to the system's own document editors (word processors, drawing tools, etc.) which will frequently differ from the ones most commonly used. Alternatively, users can create documents with their favorite tools and then import the documents into the hypertext system. However, under this scenario, any further changes to the document must be made within the hypertext system, or the document must be edited outside the system and re-imported, in which case all linking information is lost. Examples of such systems include Toolbook from Asymetrix, Hypercard from Apple Computer, Notecards (Halasz, F. G., Moran, T. P., and Trigg, R. H.; "NoteCards in a nutshell", Proc. *ACM CHI+GI'87;* 1987), KMS (Aksyn, R. M., McKracken D. L., Yoder, E. A.; "KMS: A distributed hypermedia system for managing knowledge in organizations", in *Communications of the ACM;* Vol 31, No. 7; 1988), Intermedia (Yankelovich, N., Haan, B. J., Meyerowitz, N. K., and Druker, S. M.; "Intermedia: The Concept and the Construction of a Seamless Information Environment"; in IEEE Computer, January 1988) ("Yankelovich, 1988"), and many others.

Monolithic environments are computer operating environments that provide a complete suite of applications tailored to the environment. As in the case of monolithic applications, monolithic environment force users to adapt to those applications provided with the environment. However, unlike monolithic applications, users typically can not import documents created with their customary applications because those applications are unlikely to be available in the environments. Example environments include the Andrew system. Morris, J. H.; "Make or Take" Decisions in Andrew; in Proc. *Winter Usenix Technical Conference;* February 1988 and the Penpoint Operating System from Go Corp.

The purpose of this invention is to overcome the deficiencies of the existing state of the art by allowing users to establish and maintain links and hyperlinks among documents without requiring them to change the applications that manage their documents or to change the operating environment in which they do their computer-related work. This is done by an innovative and synergistic combination of two existing technologies: a mechanism for embedding and linking objects within documents and database management. Linking and embedding objects allow documents to contain data that are foreign and maintained by other applications. Database management technology provides general mechanisms for maintaining structured data in terms of homogeneous records and fields. Date, C. J.; *An Introduction to Database Systems;* Addison-Wesley Publishing Co.; 1981.

A general architecture for supporting hyperlinking has at least two components: a way to manage the endpoints of the links (called anchors in the hypertext literature (Yankelovich, 1988; Neilsen, 1990), and a way to associate the anchors to form the links themselves. This patent application will describe embedding and linking of objects within documents to implement anchors and database technology to implement the links.

One prior art system for linking and embedding is provided by the OLE (Object Linking and Embedding) system available from Microsoft Corporation of Redmond, Wash. Before proceeding to the remainder of this discussion, it will be necessary to provide an overview of OLE and its limitations with respect to hyperlinking.

OLE provides a mechanism where certain documents called container documents (or client documents in OLE jargon) can contain information created by applications different from those used to create the client document. Microsoft Windows *Users Guide;* Microsoft Corp.; 1992. As the name implies, OLE supports two different types of containment: embedding and linking. When the foreign data is embedded in a client document, it physically resides within the document. When the foreign data is linked into the client document, only a reference to the foreign data resides in the client. The contents comprising the foreign data usually reside elsewhere, typically in another electronic file in the file system. This difference is shown pictorially in FIG. 1.

Figure 1:
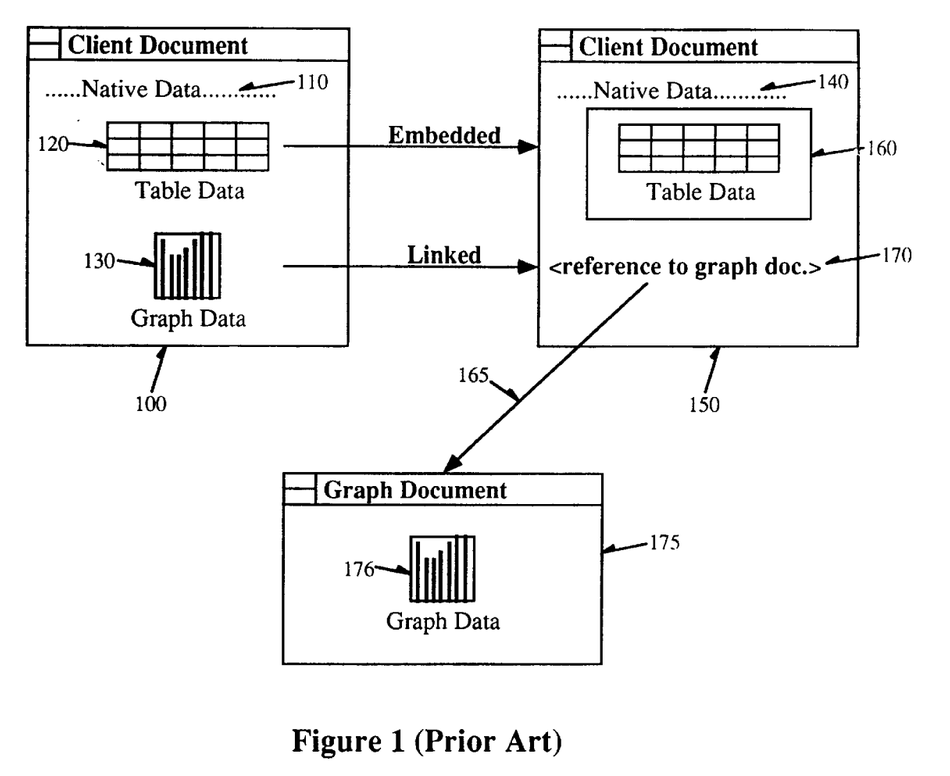
FIG. 1 shows a prior art method of linking and embedding documents.

FIG. 1 shows two views 100 and 150 of a client document (labeled "client document"). On the left hand side, 100 is a view as might be seen by a user, on the right hand side, an internal representation 150 as might be seen by the application managing the document. The user will see 120 and 130 as part of document 100. The application will see the embedded table 160 stored with the client document's native data 140, whereas an OLE link stores a pointer 170, or reference to a section within the document 175 containing the graph data 176.

The significant feature of OLE is that applications that manage client documents (called client applications) need not have the capability to manipulate the foreign data that is embedded or linked into the client documents. The foreign data "encapsulates" sufficient information to allow the OLE libraries to invoke the appropriate applications (called server applications) whenever the user wishes to alter any part of the document, whether it is native or foreign. If the part of the document to be edited is native, the user merely edits it using the tools and interface provided by the client application. If the information is foreign, the OLE libraries invoke the appropriate application with which the user then alters the foreign data. This mechanism is shown pictorially in FIG. 2.

Figure 2:
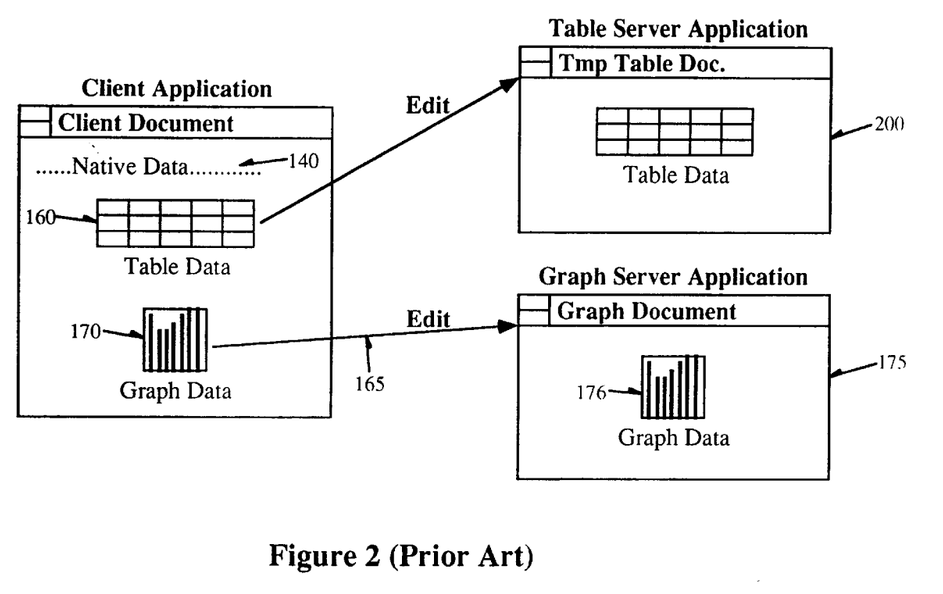
FIG. 2 shows a prior art method of editing linked and embedded documents.

FIG. 2 shows what happens when a user edits contained data. The client application realizing that the data to be edited is foreign calls the OLE libraries. They in turn, extract the information from the contained objects (a graph and a table, in this case) and invoke the appropriate editors. If the contained data is a link as in the case of the graph 170, the link contains a reference 165 to the file 175 where the graph data 176 resides. The data residing in that file is the one the user manipulates via the graph editor. If the data is embedded, it is copied to a temporary storage area 200 and then loaded into the server application.

OLE containment, whether via linking or embedding is not sufficient for hyperlinking documents for two important reasons: OLE connections are unidirectional and unitary. Unidirectionality of OLE connections means that the linked data does not contain information that records all of the places where it is contained. Thus the connection is strictly one way, from the container (or client) to the contained (or server). If the containment is through embedding, there is no way to reach the embedded data through a path other than the container. If the containment is through linking, there is no way to access the client document in which the link is contained from the server document.

A hyperlink is bi-directional, meaning it can be traversed in either direction from either anchor. For instance, in the earlier example, a document describing the 1954 British climbing expedition to Mt. Everest might have a hyperlink between Tenzing Norgay (Hillary's summit climbing partner) and his nephew Nawang Gombu (who accompanied Jim Whittaker in the first U.S. ascent of the mountain in 1963). Readers would be able to follow the link originating from a document describing either the U.S. or British expedition. Furthermore, as discussed earlier, hypertexts consist of hyperlinks, meaning the links can have multiple endpoints. Thus an anchor in one document may be linked to anchors in several document via the same link. For example, the route taken by the British expedition in 1954 (South Col) has been used by many subsequent expeditions. This relationship could be represented by a single hyperlink connecting all documents describing expeditions that followed that route. Both of these features of hypertext links (bidirectionality and multiplicity) are shown in FIG. 3.

Figure 3:
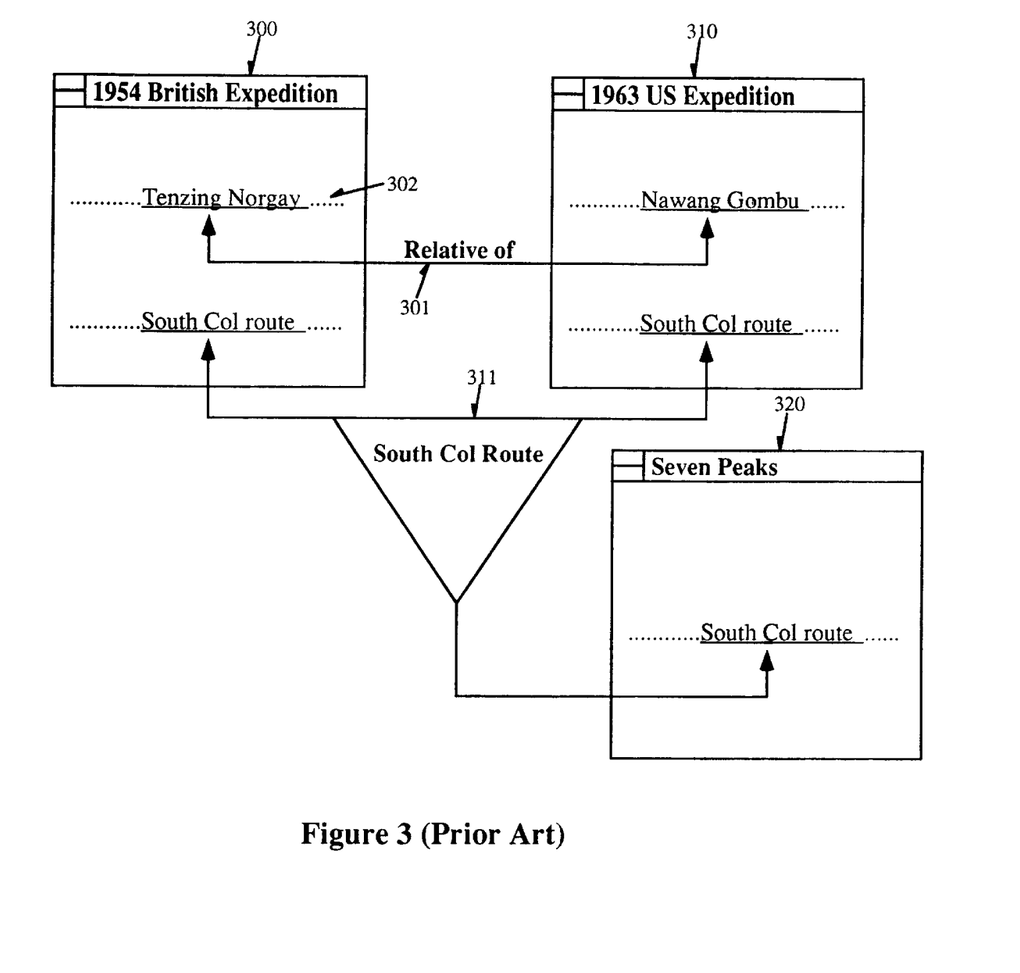
FIG. 3 shows a prior art method of hypertext linking of documents.

FIG. 3 shows the bidirectionality of hyperlinks. If a reader of the U.S. Expedition document 310 wishes to follow the "relatives of" link 301, she will be taken to the British Expedition document 300 in the passage 302 describing Tenzing Norgay. Similarly, readers will open the U.S. Expedition document 310 when they follow the "relative of" link 301 from the British Expedition document 300. The figure also shows a hyperlink 311 connecting all documents 300, 310 and 320 describing expeditions that followed the South Col route. When readers wish to follow that link, they must specify which document (usually from a list of candidates which in this case would include all three documents 300, 310 and 320) they wish to open.

SUMMARY AND OBJECTS OF THE INVENTION

One of the objects of the present invention is to provide a mechanism that supports the establishment of arbitrary relationships (links) among a variety of documents or portions of documents without editors specially written to support such linking.

Another of the objects of the present invention is to provide a method for nonbinary linking of a variety of documents, that is, hyperlinks are allowed.

Another of the objects of the present invention is to provide a method for multidirectional linking of a variety of documents, that is, their traversal can begin from any endpoint.

Another of the objects of the present invention is to provide a method for linking a variety of document wherein links can have attributes with which they are associated. These attributes are used to help users determine which links are to be traversed.

These and other objects of the present invention are provided for by linking and embedding objects in documents to implement anchors, with database management technology to relate anchors to links and links to anchors. Specifically, in one embodiment, anchors are inserted, edited, and removed from documents using linking and embedding mechanisms. Additionally, database tables are used to manage anchors and hyperlinks, and to associate anchors with hyperlinks. The detailed description below provides one possible realization of this architecture. The essential characteristics of the implementation, as claimed by the invention, are that from an anchor a set of associated hyperlinks is determined using database technology, and from a hyperlink a set of associated anchors is determined using database technology. Furthermore, such anchors can be inserted into any document created by an application which is compliant with systems permitting embedding and/or linking of objects (e.g. OLE from Microsoft). The application need not be aware that its documents participate in any hyperlinks.

BRIEF DESCRIPTION OF THE DRAWINGS

The present invention is illustrated by way of example and not limitation in the figures of the accompanying in which like references indicate like elements and in which.

DETAILED DESCRIPTION

The present invention is related to improved methods of linking data. In the following description, for the purposes of explanation, specific types of data, applications, data structures, pointers, indices, and formats are set forth in order to provide a thorough understanding of the present invention. It will be apparent, however, to one skilled in the art, that the present invention may be practiced without these specific details. In other instances, well-known structures and data are shown in block diagram form in order to not unnecessarily obscure the present invention.

Figure 4:
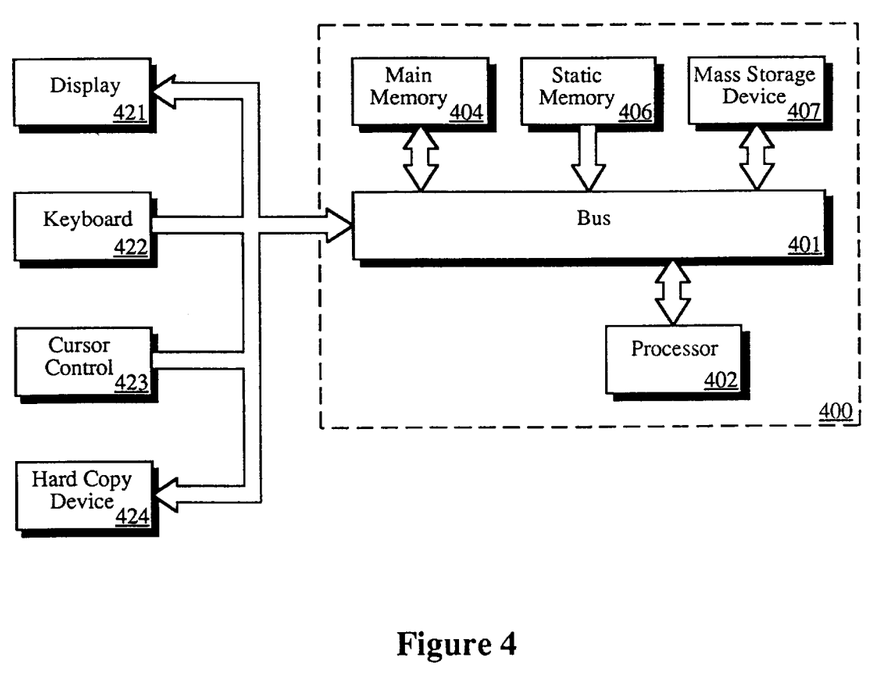
FIG. 4 shows a computer system upon which the methods and apparatus of the preferred embodiment may be implemented.

Referring to FIG. 4, the computer system upon which the preferred embodiment of the present invention is implemented is shown as 400. 400 comprises a bus or other communication means 401 for communicating information, and a processing means 402 coupled with bus 401 for processing information. System 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402, and a data storage device 407 such as a magnetic disk or optical disk and its corresponding disk drive. Data storage device 407 is coupled to bus 401 for storing information and instructions. Computer system 400 may further be coupled to a display device 421, such as a cathode ray tube (CRT) coupled to bus 401 for displaying information to a computer user. An alphanumeric input device 422, including alphanumeric and other keys, may also be coupled to bus 401 for communicating information and command selections to processor 402. An additional user input device is cursor control 423, such as a mouse, a trackball, or cursor direction keys, coupled to bus 401 for communicating direction information and command selections to processor 402, and for controlling cursor movement on display 421. Another device which may be coupled to bus 401 is hard copy device 424 which may be used for printing instructions, data, or other information on a medium such as paper, film, or similar types of media. Of course, system 400 may further be coupled to a network wherein file sharing (including the sharing of documents containing links) between nodes in the network may be accomplished for large shared hypertext systems.

In the preferred embodiment, computer system 400 is one of the IBM-type AT computers commercially available. Processor 402 is one of the Intel 80×86 family of microprocessors, such as the i386™ or i486™ (trademarks of Intel Corporation) manufactured by Intel Corporation of Santa Clara, Calif. This mechanism will work in any environment that supports object linking and embedding and database management systems. In a preferred embodiment, the DOS 5.0 brand operating system, Windows 3.1 and/or Windows for Workgroups brand operating environments are used, however, it can be appreciated by one skilled in the art that other systems having capabilities for object embedding and linking and database technology may be used in alternative embodiments.

In the preferred embodiment, hyperlinks, as described above, are implemented via four database tables. These are described in detail below. The first table represents the anchors, that is the endpoints of the hyperlinks. The rows in the anchors table include at least two fields: an internal identifier through which the system references the anchor, and a link to the container document (in a preferred embodiment, the link is created using the OLE brand object linking and embedding system available from Microsoft Corporation of Redmond, Wash., however, it can be appreciated by one skilled in the art that other mechanisms for linking and embedding objects in documents and maintaining those links can be used in alternative embodiments, e.g., the NewWave brand system available from Hewlett-Packard). The anchor object represented by a row in the table is embedded using OLE into the document to be hyperlinked. This is shown pictorially in FIG. 5. The dual use of OLE connections for a single anchor overcomes the limitations of the unidirectionality of OLE connections. The embedded anchor object allows the hyperlink application to be activated when users initiate a link traversal. The OLE link from the table entry to the anchor region in the document allows the hyperlink manager to open the appropriate document upon completion of a link traversal.

Figure 5:
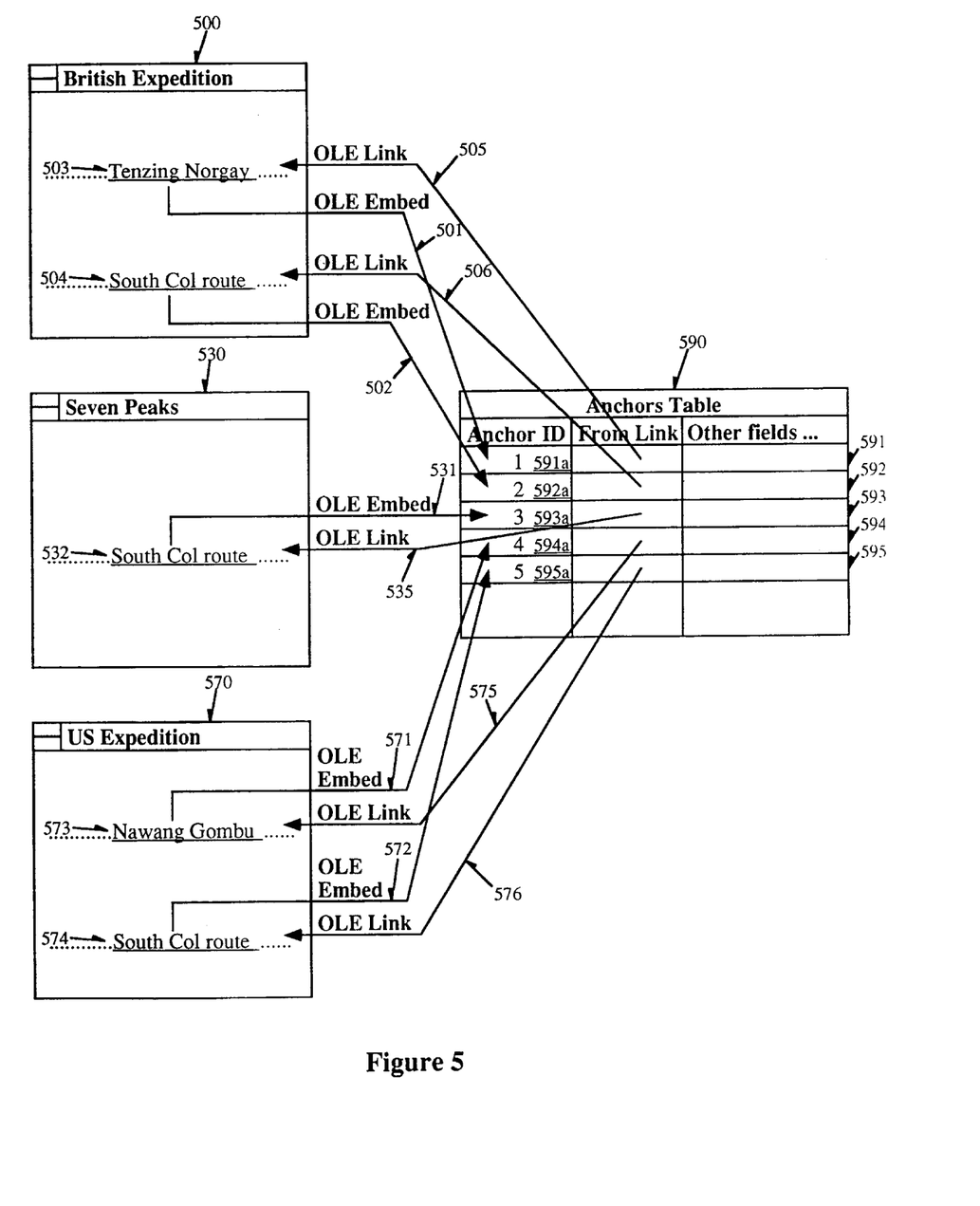
FIG. 5 shows linking documents according to the method of the preferred embodiment.

FIG. 5 shows the internal representation of hyperlink anchors used in the preferred embodiment. Each row (e.g. 591–595) of the table represents an OLE object that is embedded in a client document in the portion (e.g. 503, 504, 532, 573 and 574) corresponding to the anchor's location. That is shown as an arrow from the document (e.g. 501, 502, 531, 571, and 572). The portion of the document corresponding to the anchor's location is referenced in the database table as an OLE link (e.g. 505, 506, 535, 575, and 576). The anchor identifiers (e.g. 591a–595a) are generated automatically by the system, their actual value is immaterial, the only constraint is that different anchors have different ids. The arrows indicate directionality of hyperlink traversal, OLE embedding is used to initiate a hyperlink traversal, and the OLE link is used to complete a hyperlink traversal.

The second table is the hyperlinks table, holding information regarding each hyperlink. The rows in the hyperlinks table include at least an internal identifier through which the link can be referred by the system and an external identifier or name that is meaningful to users. This is shown pictorially in FIG. 6 discussed below.

Figure 6:
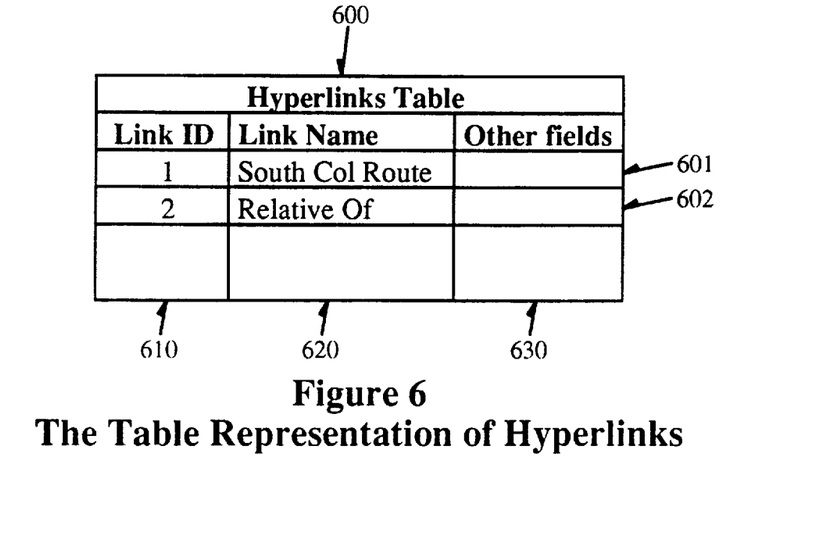
FIG. 6 shows the hyperlinks table used in the preferred embodiment.

FIG. 6 shows the Hyperlinks table 600 used in the preferred embodiment. Each row (e.g. 601, 602 . . . ) corresponds to a single hyperlink and is independent of the number of anchors that participate in the hyperlink. There may be additional information included in the table (e.g. in fields 630), such as hyperlink types, etc. in alternative embodiments, but for the purposes of this invention, only the two fields 610 and 620 are used.

The associations between anchors and hyperlinks is represented by a third table, the Connections table 700. Each entry in the Connections table includes both a link ID 710 and an anchor ID 720, indicating a single connection between anchor and link. There can be multiple rows (e.g. 730–732 or 741–742) with the same link ID, as well as multiple rows with the same anchor ID. This permits an anchor to participate in multiple hyperlinks and hyperlinks to connect to multiple anchors. As shown in the example above (FIG. 3), three anchors participate in the hyperlink 311 labeled "South Col Route". The table may be indexed by either ID 710 or 720 to permit enumerating the hyperlinks associated with an anchor or the anchors associated with a hyperlink. The Connections table is shown pictorially in FIG. 7 discussed below.

Figure 7:
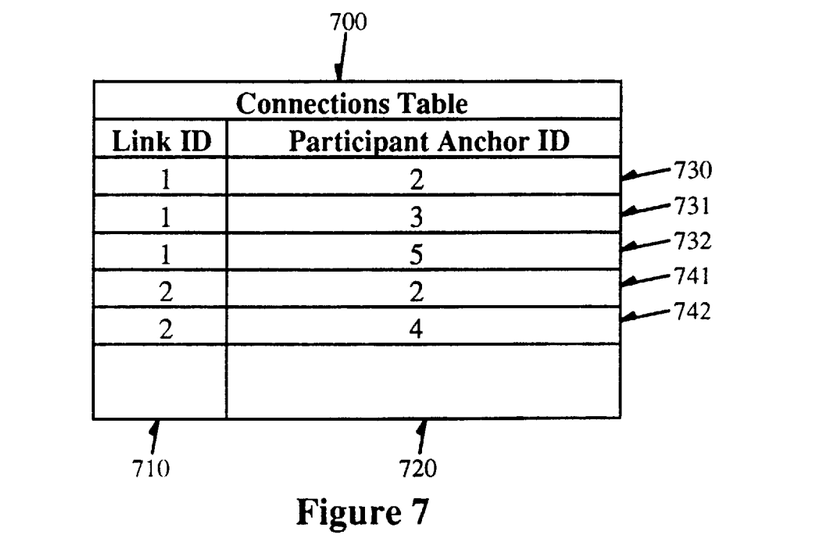
FIG. 7 shows the connections table used in the preferred embodiment.

FIG. 7 shows the Connections table 700. Each row (e.g. 730–732 and 741–742) corresponds to the association between an anchor and a hyperlink. The set of all such associations for a given link ID indicates all anchors connected with that hyperlink, that is, a set of anchors that are all linked to one another. Similarly, the set of all such associations for a given anchor ID indicates all hyperlinks in which the anchor participates. Table values shown above correspond to the values in the tables in FIGS. 5 and 6 above, showing the connections between the anchors (table 590) and the hyperlinks (table 600).

The fourth database table 800 in this embodiment manages arbitrary attributes associated with links. It is not essential for the maintenance of hyperlinks, however it is frequently useful to have such attributes, for they can store such information as the link's owner 811, the date in which it was established, etc. The attributes table is shown pictorially in FIG. 8 described below.

Figure 8:
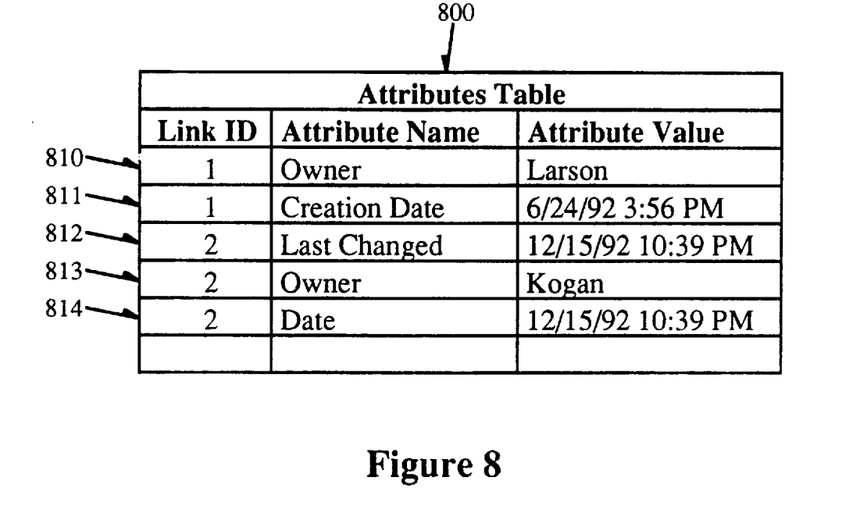
FIG. 8 shows the attributes table used in the preferred embodiment.

FIG. 8 shows the link attributes table. Each row (e.g. 810–814) corresponds to an attribute-value pair for a single link. Link 1 (the South Col Route link) has two attributes, an owner (Larson) 810 and a creation date 811. Link 2 (the Relatives Of link) has three attributes, an owner (Kogan) 813, a creation date 814, and a date when the link was last changed 812.

The first three database tables work together to provide the bidirectional, multiway linking (or hyperlinking) that is desired. The manner in which they work is explained below and pictorially in the flowchart of FIG. 9.

Figure 9:
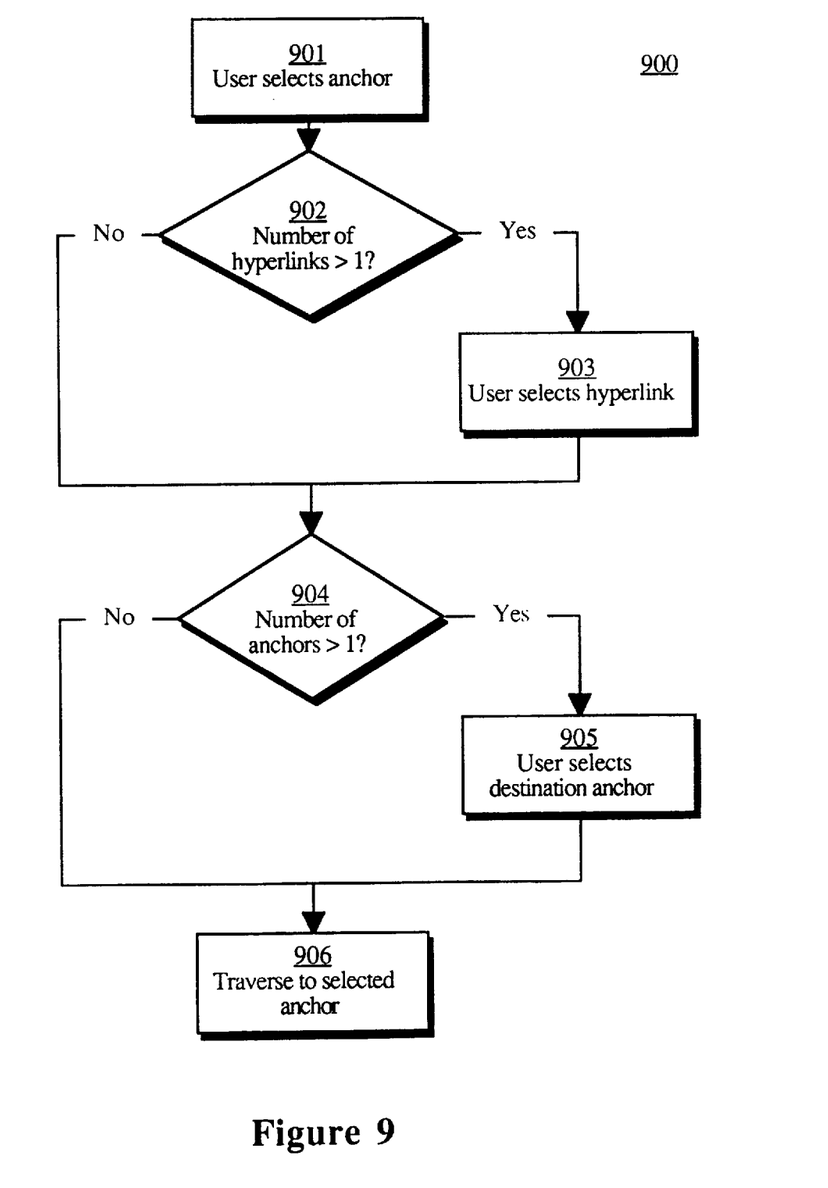
FIG. 9 shows a flow diagram of a process used when a user desires to traverse a link.

As shown in FIG. 9, the user selects an anchor at step 901 using the selection mechanisms available to the document's editor. The hyperlink manager is invoked via OLE and the anchor's identifier is determined from the database table entry corresponding to the anchor's OLE object. A database query determines whether the anchor participates in more than one hyperlink at step 902. If so, the user interactively selects one at step 903. Once a hyperlink is selected, the number of candidate anchors to which the traversal can complete is determined. If there is only one, the traversal completes without user interaction at step 904, otherwise, the user selects one at step 905 and the traversal completes at step 906. The actual opening of the target document, in which the target anchor is embedded, is achieved via OLE linking.

When a user opens a document that participates in a hypertext link (that is, it has incoming or outgoing links), the endpoints of the hyperlinks will be visible as anchors in this embodiment. Selecting one of the anchors will, upon user command[2] invoke the hyperlink application because anchors are OLE objects. The hyperlink manager will determine the anchor's identifier by table lookup in the Anchors table and then determine the links in which the anchor participates using the connections table. If the anchor participates in only one link (as in the case of the anchors in the Mt. Everest example), a link traversal is initiated. Otherwise the hyperlink manager presents to the user a list of all hyperlinks in which the anchor participates. Once the user chooses one of the hyperlinks, a link traversal is initiated. The set of hyperlinks in which the anchor participates is determined via a selection operation on the connections table and a join between that selection and the Hyperlinks table. The pseudo-SQL code to achieve this is shown below:

[2] The exact nature of the command is not relevant to this discussion and will depend on the implementation of the user interface of that application. Most frequently, the anchor will be selected via a pointing device, such as a "mouse", and the command to access the anchor's hyperlinks will be invoked by double clicking one of the mouse's buttons.

```
select link name from Hyperlinks, Connections
where Participant_Anchor_ID = <the identifier of the anchor the user
selected> AND
    Hyperlinks.Link_ID = Connections.Link_ID
```

To complete a link traversal, the hyperlink manager determines the possible anchors to which the traversal could go. If there is only one, the traversal is completed using that one anchor, otherwise, the hyperlink manager presents to the user the set of possible anchors to which the traversal can complete. To determine the set of all participant anchors in a hyperlink, the link manager performs a compound selection on the connections table to select only those anchors that participate in the selected hyperlink and do not equal the original anchor (the one selected by the user to initiate the process). The pseudo SQL to achieve this is shown below:

```
select anchor_ID from Connections
where Participant_Anchor_ID <the identifier of the anchor the user
selected> AND
    Link_ID = <the identifier of the link that initiates this
traversal>
```

When the destination anchor is determined, link traversal finishes by following the OLE link from the anchor to the linked document.

Figure 10:
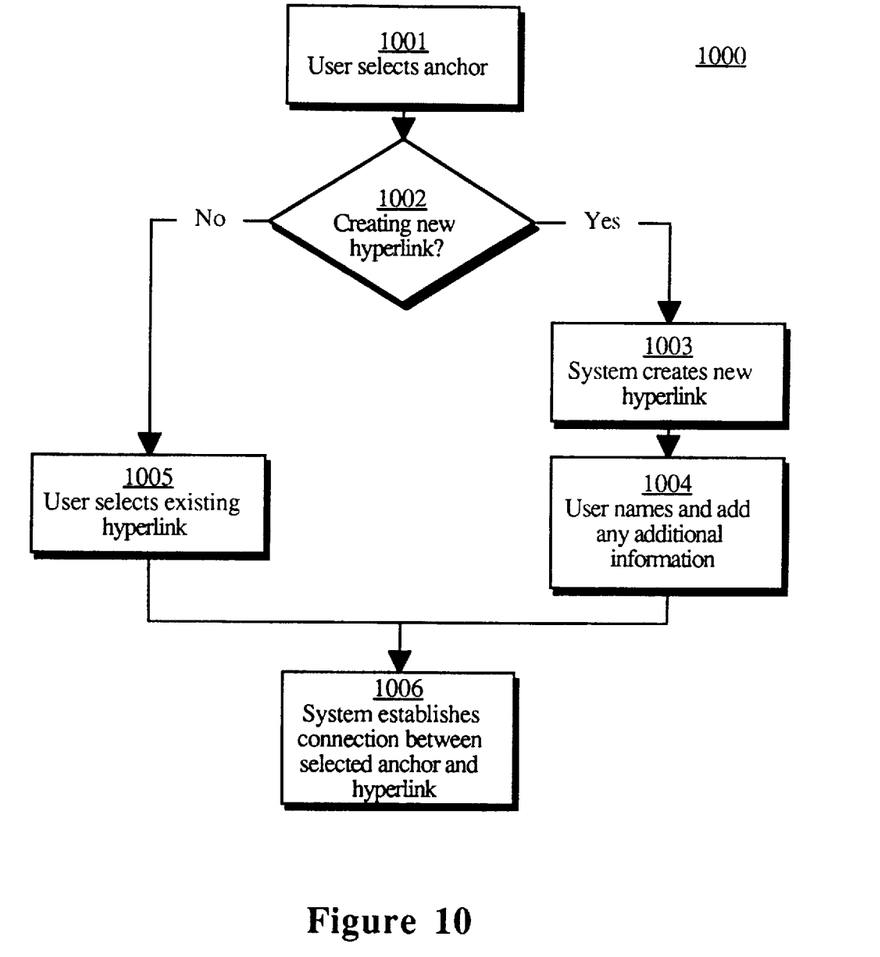
FIG. 10 shows a flow diagram of a process used for associating anchors with hyperlinks.

The process of establishing a hyperlink is described with reference to FIG. 10. As shown in FIG. 10, the user selects an anchor using the selection mechanisms available to the document's editor at step 1001. The hyperlink manager is invoked via OLE and the anchors identifier is determined from the database table entry corresponding to the anchor's OLE object. The hyperlink manager determines whether the user is creating a new hyperlink or adding the selected anchor to an existing one at step 1002. If the user is creating a new hyperlink, the system prompts the user for all necessary information, e.g., hyperlink name at steps 1003 and 1004. Finally, the system establishes the connection between the selected anchor and the hyperlink at step 1006. If it is an existing hyperlink, it is selected at step 1005.

Establishing a connection between two anchors, i.e., those in two distinct documents, is achieved by connecting both anchors to the same hyperlink. This is done using the same method shown in FIG. 10 above once for each anchor.

The mechanism described above provides a way to establish and manage hyperlinks among different documents. This mechanism will work with any document whose application conforms to the OLE standard[3]. No other assumptions or restrictions are necessary. Users will not need to adapt to different applications in order to make use of this hyperlinking[4] mechanism and they will not be hampered by the limitations imposed by the OLE standard.

[3] There is presently a large and ever growing number of applications that are OLE compliant.
[4] Unless their customary applications do not conform to the OLE standard.

Thus, an invention for creating and maintaining links among heterogeneous documents has been described. Although the present invention has been described particularly with reference to specific data structures, processes, etc., it may be appreciated by one skilled in the art that departures and modifications may be made by one of ordinary skill in the art without departing from the general spirit and scope of the present invention.

What is claimed is:

1. In a computer system, a method for hyperlinking documents each managed by different application programs comprising the following steps:

creating a first anchor at a first region in a first document and storing a first anchor identifier (ID) in a first position of a first table;

creating a second anchor at a second region in a second document and storing a second anchor identifier (ID) in a second position of said first table;

storing a first hyperlink identifier (ID) with said first anchor ID and second anchor ID in order to identify a first hyperlink relationship between said first region in said first document and said second region in said second document;

creating a third anchor in a third document at a third region in said third document and storing a third anchor identifier (ID) in a third position in said first table; and storing said first hyperlink ID with said third anchor ID in order to include said third region in said third document in said first hyperlink relationship including storing a third entry in a connections table, said third entry including said third anchor ID and said first hyperlink ID.

2. The method of claim 1 wherein said different application programs do not support hyperlinking.

3. The method of claim 1 wherein said step of creating an anchor comprises the following steps:

embedding an object at a region in a document comprising a reference to a position in a table;

storing a link in said position in said table to said region in said document; and storing an anchor identifier (ID) in said position in said table.

4. The method of claim 3 further comprising associating additional attributes with said first position associated with said first anchor and said second position associated with said second anchor in said first table.

5. The method of claim 3 wherein the steps of embedding and linking comprise object linking and embedding (OLE).

6. The method of claim 1 wherein said step of storing said first hyperlink ID with said first anchor ID and second anchor ID in order to identify said first hyperlink relationship between said first region in said first document and said second region in said second document includes storing a first entry and a second entry in said connections table, said first entry including said first anchor ID and said first hyperlink ID, and said second entry including said second anchor ID and said first hyperlink ID.

7. The method of claim 1 further comprising the following steps:

creating a fourth anchor in a fourth region in a fourth document and storing a fourth anchor identifier (ID) in a fourth position in said first table; and storing a second hyperlink identifier (ID) with said first anchor ID and said fourth anchor ID in order to identify a second hyperlink relationship between said first region in said first document and said fourth region in said fourth document.

8. The method of claim 7 wherein said step of storing said second hyperlink ID with said first anchor ID and said fourth anchor ID in order to identify said second hyperlink relationship between said first region in said first document and said fourth region in said fourth document includes storing a fourth entry and a fifth entry in said connections table, said fourth entry including said first anchor ID and said second hyperlink ID, and said fifth entry including said fourth anchor ID and said second hyperlink ID.

9. In a computer system, a method for hyperlinking related portions of a plurality of documents which may be managed by different application programs comprising the following steps:
   a. creating an anchor in each of said plurality of documents, each anchor in each of said plurality of documents created by embedding an object at a region in said each of said plurality of documents which comprises a reference to a position in an intermediate table;
   b. for each said position referenced by said plurality of documents in said intermediate table, storing a first hyperlink identifier (ID) for a first hyperlink relationship between each said region in each of said plurality of documents;
   c. embedding an additional object at an additional region in an additional document which comprises an additional reference to an additional position in said intermediate table;
   d. inserting a link from said additional position in said intermediate table to said additional region in said additional document; and
   e. for at least one of said plurality of documents, storing a second hyperlink identifier (ID) for at least one said position in said intermediate table and said additional position for a second hyperlink relationship between at least one region in at least one of said plurality of documents, and said additional region in said additional document, including storing said second hyperlink ID in a connections table along with a unique anchor ID for said at least one said position in said intermediate table and a second unique anchor ID for said additional position in said intermediate table in order to identify said second hyperlink relationship.

10. The method of claim 9 wherein said step of storing said first hyperlink ID for said first hyperlink relationship between said each said region in each of said plurality of documents for each said position in said intermediate table includes storing said first hyperlink ID for each said position in said intermediate table in said connections table along with said unique anchor ID for each said entry in said intermediate table in order to identify said first hyperlink relationship between each said region in each of said plurality of documents.

11. The method of claim 9 wherein said step of creating said anchor in each of said plurality of documents further comprises the step of inserting the link from each said position referenced by each of said plurality of documents in said intermediate table to said region in said each of said plurality of documents.

12. The method of claim 9 wherein said different application programs do not support hyperlinking.

13. In a computer system, an apparatus for hyperlinking documents each managed by different application programs comprising:
   first anchor creation means for creating a first anchor at a first region in a first document;
   means for storing a first anchor identifier (ID) in a first position of an intermediate table;
   second anchor creation means for creating a second anchor at a second region in a second document;
   means for storing a second anchor identifier (ID) in a second position of said intermediate table;
   hyperlink identification means coupled to said first anchor creation means and said second anchor creation means for storing a first hyperlink identifier (ID) with said first anchor ID and said second anchor ID in order to identify a first hyperlink relationship between said first region in said first document and said second region in said second document;
   third anchor creation means for creating a third anchor at a third region in a third document;
   means for storing a third anchor identifier (ID) in a third position of said intermediate table;
   hyperlink identification means for storing said first hyperlink ID with said third anchor ID in order to include said third region in said third document in said first hyperlink relationship including a means for storing a third entry in a connections table, said third entry including said third anchor ID and said first hyperlink ID.

14. The apparatus of claim 13 wherein an anchor creating means comprises:
   means for embedding an object at a region in a document comprising a reference to a position in said intermediate table; and
   means for storing a link in said position in said intermediate table to said region in said document.

15. The apparatus of claim 13 wherein said means for storing said first hyperlink ID with said first anchor ID and second anchor ID in order to identify said first hyperlink relationship between said first region in said first document and said second region in said second document includes a means for storing a first entry and a second entry in said connections table, said first entry including said first anchor ID and said first hyperlink ID, and said second entry including said second anchor ID and said first hyperlink ID.

16. The apparatus of claim 13 further comprising:
   means for creating a fourth anchor at a fourth region in a fourth document;
   means for storing a fourth anchor identifier (ID) in a fourth position in said first table; and
   second hyperlink identification means for storing a second hyperlink identifier (ID) with said first anchor ID and said fourth anchor ID in order to identify a second hyperlink relationship between said first region in said first document and said fourth region in said fourth document.

17. The apparatus of claim 16 wherein said second hyperlink identification means includes a means for storing a fourth entry and a fifth entry in said connections table, said fourth entry including said first anchor ID and said second hyperlink ID, and said fifth entry including said fourth anchor ID and said second hyperlink ID.

* * * * *